United States Patent
Bozchalui et al.

(10) Patent No.: US 8,762,189 B2
(45) Date of Patent: Jun. 24, 2014

(54) SYSTEMS AND METHODS FOR STOCHASTICALLY USING ELECTRIC VEHICLES AS MOBILE ENERGY STORAGE

(71) Applicants: Mohammad Chehreghani Bozchalui, Cupertino, CA (US); Ratnesh Sharma, Fremont, CA (US)

(72) Inventors: Mohammad Chehreghani Bozchalui, Cupertino, CA (US); Ratnesh Sharma, Fremont, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/646,616

(22) Filed: Oct. 5, 2012

(65) Prior Publication Data

US 2013/0226637 A1    Aug. 29, 2013

Related U.S. Application Data

(60) Provisional application No. 61/602,783, filed on Feb. 24, 2012.

(51) Int. Cl.
*G06Q 40/00* (2012.01)

(52) U.S. Cl.
USPC ................ 705/7.11; 705/7.42; 701/22

(58) Field of Classification Search
USPC .................. 705/7.11, 7.42; 701/22
See application file for complete search history.

(56) References Cited

U.S. PATENT DOCUMENTS

| | | | |
|---|---|---|---|
| 8,457,821 B2 * | 6/2013 | Shaffer | 701/22 |
| 2009/0210357 A1 * | 8/2009 | Pudar et al. | 705/412 |
| 2010/0082464 A1 * | 4/2010 | Keefe | 705/32 |
| 2010/0274656 A1 * | 10/2010 | Genschel et al. | 705/14.27 |
| 2011/0202217 A1 * | 8/2011 | Kempton | 701/22 |
| 2011/0202418 A1 * | 8/2011 | Kempton et al. | 705/26.1 |

OTHER PUBLICATIONS

Ripaccioli et al., A Stochastic Model Predictive Control Approach for Series Hybrid Electric Vehicle Power Management, 2010 American Control Conference, Jul. 2010, p. 5844-5849.*

Moura et al., A Stochastic Optimal Control Approach for Power Management in Plug-In Hybrid Electric Vehicles, IEEE Transactions on Control Systems Technology, 2010, p. 1-11.*

Lin et al., A Stochastic Control Strategy for Hybrids, 2004 American Control Conference, Jul. 2004, p. 4710-4715.*

Bozchalui et al, Analysis of Electric Vehicles as Mobile Energy Storage in Commercial Buildings: Economic and Environmental Impacts, IEEE 2012.

Hu et al, Optimal Operation of Electric Vehicles in Competitive Electricity Markets and Its Impact on Distribution Power Systems, 2011 IEEE Trondheim PowerTech.

Hutson et al, Intelligent Scheduling of Hybrid and Electric Vehicle Storage Capacity in a Parking Lot for Profit Maximization in Grid Power Transactions, IEEE Energy 2030, Nov. 2008.

Momber et al, Plug-in Electric Vehicle Interactions with a Small Office Building: An Economic Analysis using DER-CAM, IEEE 2010.

* cited by examiner

*Primary Examiner* — Justin M Pats
*Assistant Examiner* — Benjamin S Fields
(74) *Attorney, Agent, or Firm* — Joseph Kolodka

(57) ABSTRACT

Systems and methods for energy management includes receiving parameters from commercial building management system components; generating a stochastic programming model of electric vehicles (EVs) as mobile energy storage (MES) for optimal planning, operation, and control purposes; and controlling operation of EVs according to the stochastic programming model to lower operating cost and carbon emission.

20 Claims, 4 Drawing Sheets

SYSTEMS AND METHODS FOR STOCHASTICALLY USING ELECTRIC VEHICLES AS MOBILE ENERGY STORAGE

This application claims priority to Provisional Application Ser. No. 61/602,783 filed Feb. 24, 2012, the content of which is incorporated by reference.

BACKGROUND

This application relates to mobile energy storage systems in commercial buildings.

Electric vehicles (EVs) have attracted much attention in recent years mainly due to economic and environmental concerns. It is expected that 3 million EVs to be on the read in California by 2015. While wide-scale penetration of EVs in electric systems brings new challenges to electric systems that need to be addressed, at the same time, it shows great potentials and new opportunities to improve efficiency of energy and transportation sectors. One can take advantage of the unique characteristics of these relatively new components of energy systems to address some of the existing issues of the grid.

EVs can be considered as Mobile Energy Storage (MES) that are available only during certain hours of a day. The presence of these MESs in an energy system, e.g., commercial building, offices, schools, colleges, etc., depends on many uncertain parameters such as end-users driving patterns, weather conditions, fuel price, and electricity price. Also, the initial level of energy stored in each MES connected to an energy system is an uncertain parameter. These probabilistic parameters might follow specific patterns that are associated with some probability distribution functions, and can be forecasted with a degree of uncertainty.

The use of EVs is particularly of importance for commercial buildings, where employees can plug in their EVs to the building energy system to be charged and/or discharged controlled by the Energy Management System (EMS) of the building. This invention investigates the optimal planning, operation, and control of such MESs using stochastic optimization techniques.

In the context of smart grids, smart distribution systems are envisioned as coupled microgrids (μG) that not only are connected to the grid, but also utilize Distributed Energy Resources (DERs) to generate power. High level of DERs integration in μGs raises concerns about the availability of high quality power supply mainly due to the variable and intermittent nature of power generation by Renewable Energy Resources (RESs). To cope with these issues, energy storage systems have been proposed to be used in μGs with DERs. When added, an energy storage system can immediately improve μGs' availability. Today, pumped hydro, flywheel, compressed air, and different types of batteries are the main energy storage technologies considered in the US electric power grid. In addition to these technologies, EVs can be considered as MES that are available only during certain hours of the day. FIG. 1 shows an exemplary load profile of a large commercial building office during weekdays and weekends for summer and winter. As shown therein, peak energy usage occurs during working hours, and drops off during non-working hours.

SUMMARY

In one aspect, systems and methods for energy management includes receiving parameters from commercial building management system components; generating a stochastic programming model of electric vehicles (EVs) as mobile energy storage (MES) for optimal planning, operation, and control purposes; and controlling operation of EVs according to the stochastic programming model to lower operating cost and carbon emission.

In another aspect, systems and methods are disclosed that uses EVs as MESes that are available only during certain hours of the day. For commercial buildings, employees can plug in their EVs to the building energy system to be charged and/or discharged by Energy Management System (EMS) of the building. One embodiment analyzes economic and environmental benefits of the application of EVs as MES in commercial building μGs. The system models energy systems of a commercial building including its grid connection, DERs, Stationary Energy Storage (SES), and demand profile. Based on the developed models, a Mixed Integer Linear Programming (MILP) problem is formulated in one embodiment to optimizes the operation of a commercial building μG. The objective is to minimize μG's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial μG.

Implementations of the above system can include one or more of the following. Optimal planning, operation, and control of EVs as MESs are formulated as stochastic optimization problems considering different uncertainties in parameters. Mathematical models are used to properly formulate the optimal planning, operation, and control of energy systems with EVs as MESs. This includes mathematical modeling of grid connection, energy pricing schemes, various DERs, Stationary Energy Storage (SES), demand profiles, and MESs as well as uncertain deriving patterns of EV owners. Technical and operational constraints of DERs, SESs, and MESs such as minimum up time and down time, and charging and discharging power and capacity constraints are formulated to appropriately model the operation of an energy system. Based on the developed models, stochastic optimization problems are formulated to optimizes the planning, operation, and control of an energy systems with EVs. Different objective functions such as minimizing total costs, daily operational costs, and greenhouse gas emissions (GHG) are provided. The optimization models are formulated as stochastic linear programming problem considering several random quantities such as initial state of charge of EVs, arrival and departure times (connection and disconnection times) of EVs, electricity price, electricity demand of the energy system, and renewable energy generation.

Advantages of the preferred embodiments may include one or more of the following. The provided stochastic optimization framework results in more accurate and realistic representation of these energy systems which may lower total costs and emissions of such systems. The system provides economic and environmental benefits of the application of EVs as MES in commercial building μGs. A comprehensive analysis is done where energy systems of a commercial building including its grid connection, DERs, Stationary Energy Storage (SES), and demand profile are modeled. Based on the developed models, a Mixed Integer Linear Programming (MILP) problem is formulated to optimizes the operation of a commercial building μG. The system minimizes μG's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial μG. The ability to use EVs to augment energy supply is particularly of interest for commercial buildings, where employees can plug in their EVs to the building energy system to be charged and/or discharged by Energy Management System (EMS) of the building. Technical and operational constraints of DERs and ES such as minimum up time and down time, load sharing characteristics of diesel generators, and charging and discharging constraints of ES devices are formulated to appropriately model the operation of a grid connected commercial μG. This provides a more accurate model to assess economic and environmental impacts of EVs in commercial buildings.

DESCRIPTION

In Smart Grids, commercial buildings can be seen as μGs that not only have grid connection, but also utilize various types of DERs to supply their demand. In this context, commercial building EMSs are expected to have the capability of controlling the operation of various components of their energy systems including DERs, ESs, and energy trade with the grid.

In commercial building μGs, EVs can be considered as MES mediums that are only available during certain hours of the day, and during these hours, the EMS can utilize both the energy stored in these EVs and their connected capacity. In this work, we consider integrated values of all connected EVs to the commercial building as a single MES. This MES is assumed to have a known (forecasted) connection time, available capacity and stored energy. The available capacity and stored energy of the MES might change during the day, reflecting the connection/disconnection of EVs to/from the building. The developed model generates operational schedule for all the components, including MES. The charging/discharging control of the obtained schedule for the MES among the connected EVs can be estimated using suitable processes.

Figure 1:
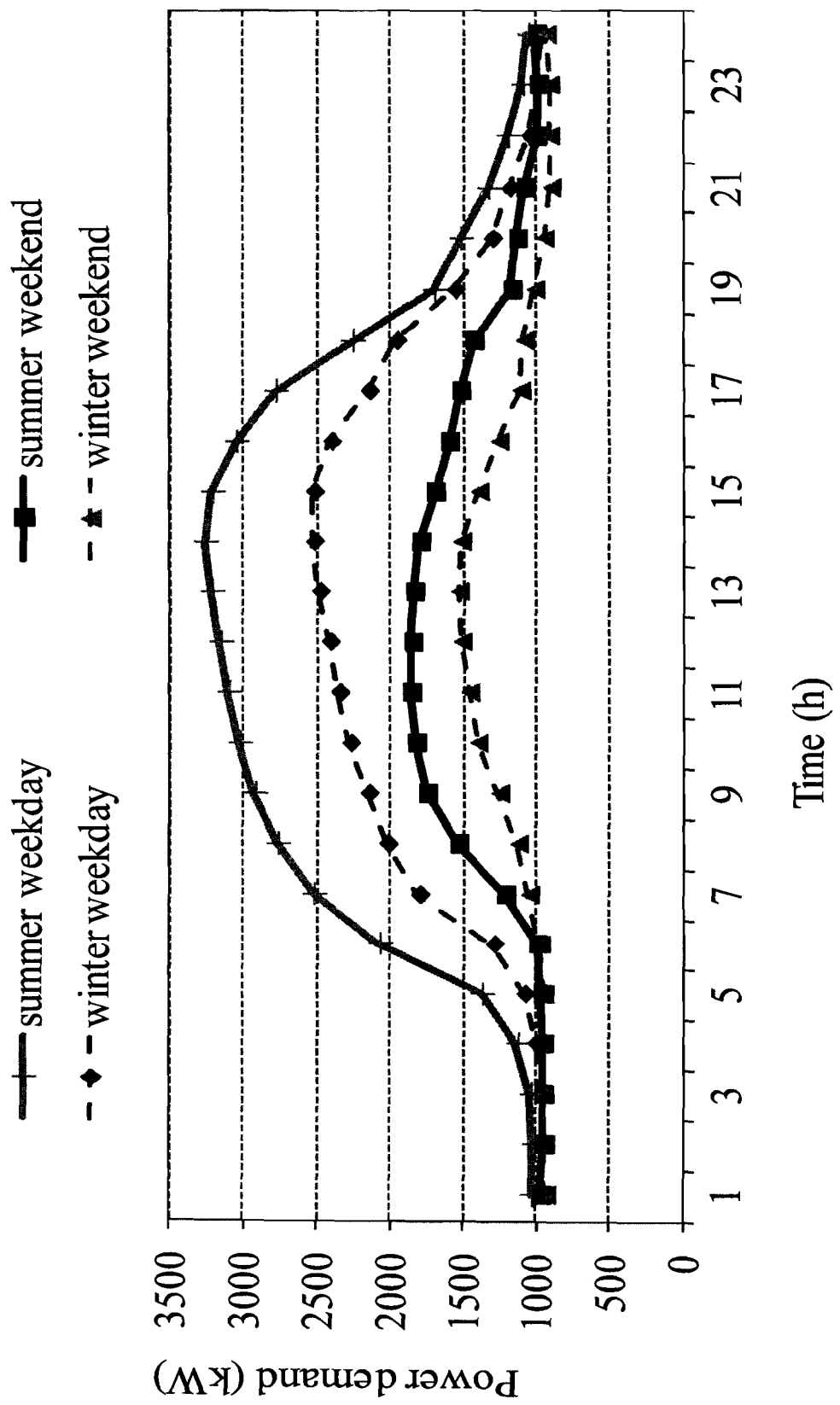
FIG. 1 shows an exemplary load profile of a large commercial building office during weekdays and weekends for summer and winter.
Figure 2:
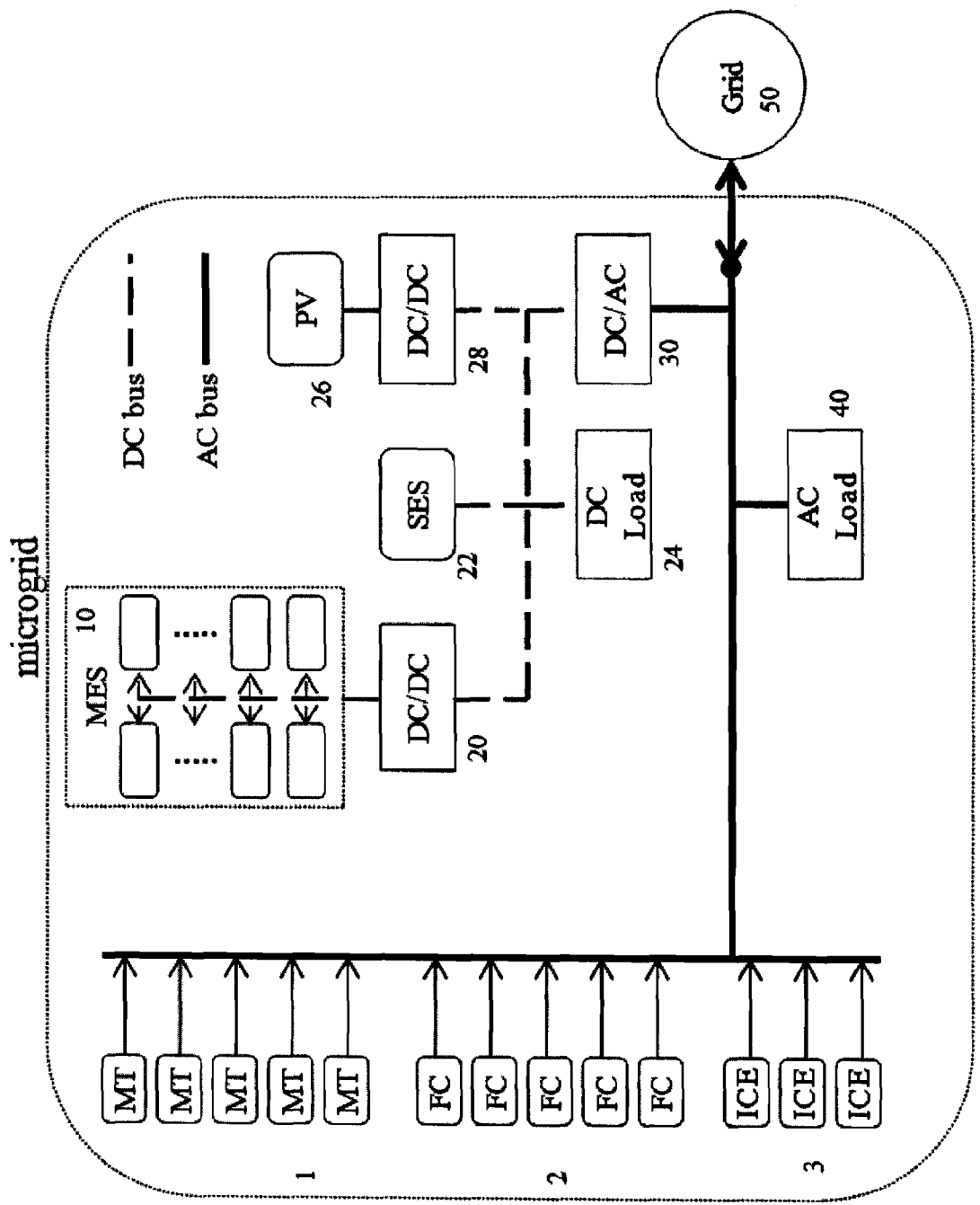
FIG. 2 shows an exemplary block diagram of a commercial building microgrid generator.

A block diagram of an exemplary commercial building μG used to carry out simulations is presented in FIG. 2. The μG consists of DC and AC buses and utilizes PV, FC, ICE, and MT in addition to the grid connection to supply its demand. SES and MES are connected to the DC bus of the system and their energy flow and storage can be controlled by the EMS of the μG. The μG trades energy with the grid and can sell to and/or buy from the grid. The grid charges the μG for its energy consumption and peak demand, and pays for its energy supply and spinning reserve capacity. As shown therein, MTs 1, FC 2, and ICE 3 supply energy over AC/DC buses to power AC load 40, DC/AC converter 30, and grid 50. Each vehicle or MES 10 includes a plurality of battery units that are connected to a DC/DC converter 20 that provides energy over a private bus to supply power to a DC load 24, SES 22, and DC/AC converter 30. A photovoltaic panel 26 can power a DC/DC converter 28 that supplies power to the private bus.

Figure 3:
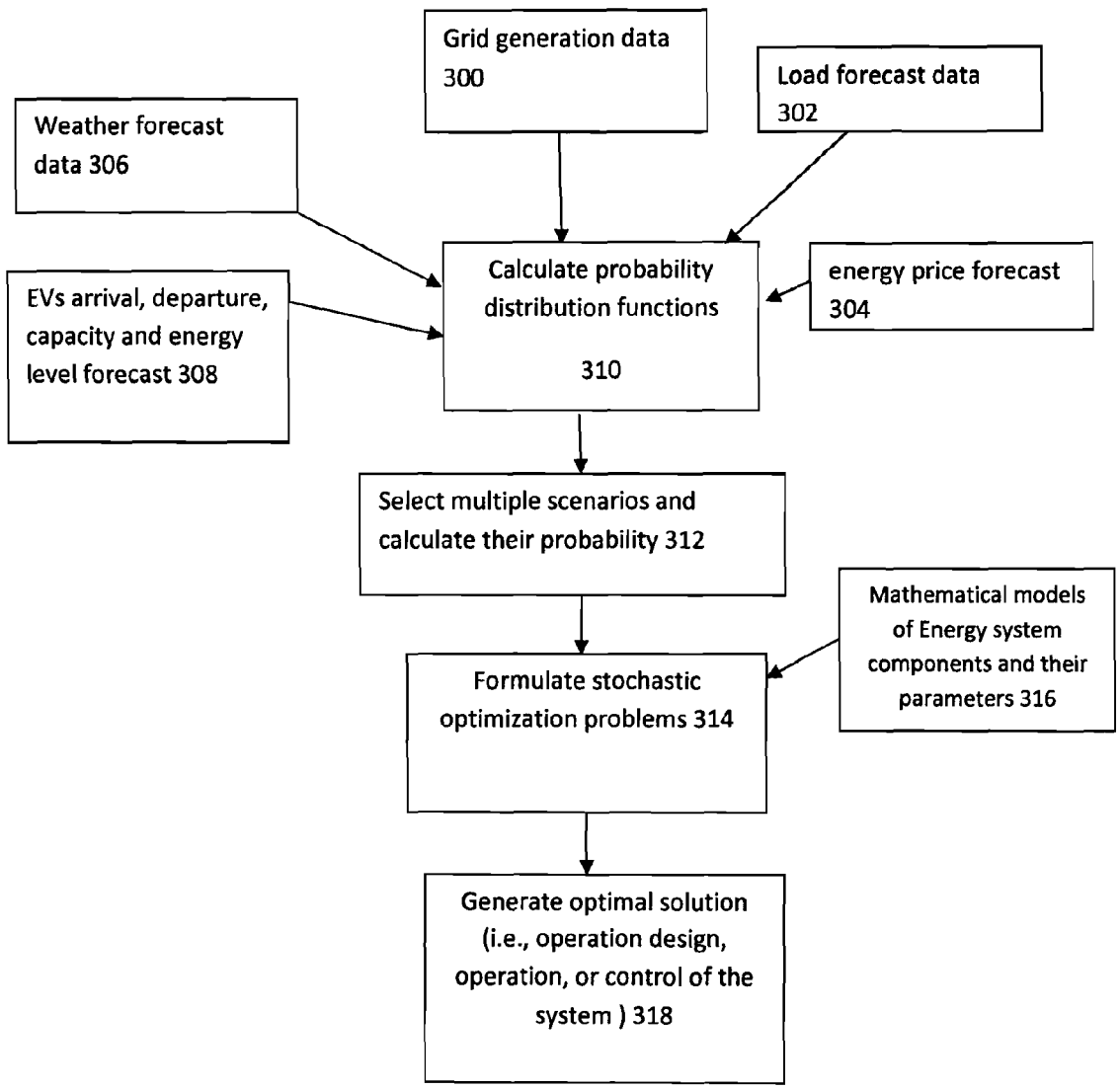
FIG. 3 shows an exemplary system for optimizing economic and environmental impacts using EVs as mobile energy storage systems.

FIG. 3 shows an exemplary system for optimizing economic and environmental impacts using EVs as mobile energy storage systems. Power generation data and energy price forecast are provided (300). Load forecast data is also input (302). The system also receives commercial building energy system components and parameters (304). Weather forecast data (306) is provided. EV capacity and energy level forecast are also received (308). With the input data, the system performs one or more optimization models of the system components (310). Next, the system optimizes for selected objective functions (312). An optimal generation schedule of system components is generated (314). The system then analyzes economic and environmental impacts (316).

Figure 4:
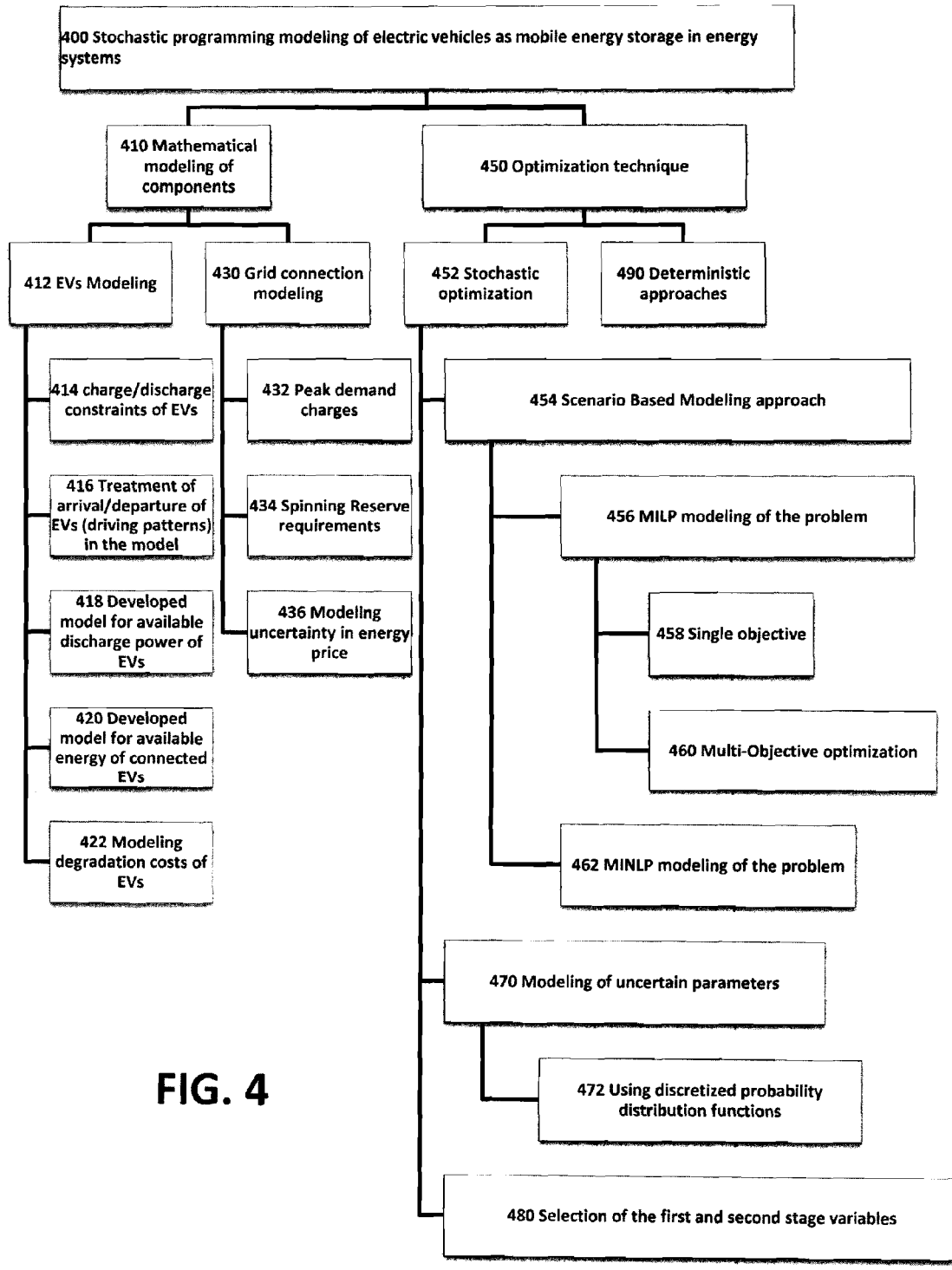
FIG. 4 shows an exemplary system for Using EVs as mobile energy storage in commercial buildings.

FIG. 4 shows an exemplary system for Using EVs as mobile energy storage in commercial buildings as a stochastic programming modeling of electric vehicles as mobile energy storage in energy systems (400). In 410, the system can perform mathematical modeling of components. Such modeling can include EVs Modeling 412. In 414, the system can model charge/discharge constraints of EVs. In 416, the system can model treatment of arrival/departure of EVs (driving patterns) in the model. In 418, the system can develop a model for available discharge power of EVs. In 420, the system can develop a model for available energy of connected EVs. In 422, the system includes modeling degradation costs of EVs.

In 430, grid connection is modeled and such model can include a number of details. In 432, the system can model peak demand charges. In 434, the system models Spinning Reserve requirements. In 436, the system can model uncertainty in energy price.

The system can apply one or more optimization techniques (450). For example, stochastic optimization can be done (452) or deterministic approaches can be done (490). In 454, the system takes a scenario based modeling approach. In 456, MILP modeling of the problem can be done. In 458, a single objective can be done, or alternatively, in 460, a multi-objective optimization can be done. In 462, the system can do MINLP modeling.

The system can also model uncertain parameters in 470. For example, in 472, the system can use discretized probability distribution functions. In 480, the system can select the first and second stage variables.

In one embodiment, stochastic programming modeling is done for electric vehicles as mobile energy storage for optimal planning, operation, and control purposes is novel in terms of both the mathematical modeling of components and the optimization techniques.

The general form of the developed the two-stage model is as follows:

$$\min_{x \in \mathbb{R}^n} c'x + \mathrm{E}_{[Q(x,\xi)]}$$

$$\text{s.t. } \Sigma_j a_{ij} x_j \leq b_i \quad (1)$$

where $Q(x, \xi)$ is the optimal value of the second-stage problem:

$$\min_{y \in \mathbb{R}^m} q'y$$

$$\text{s.t. } \Sigma_k V_{ks} x_k + \Sigma_k w_{ks} y_s \leq h_s \quad (2)$$

here $\xi := (q, h, V, W)$ are the data of the second-stage problem, and some or all elements of vector $\xi$ are random.

$\mathbb{E}[Q(x, \xi)]$ is the expected operator with respect to the probability distribution of $\xi$, which has a finite number of realizations (called scenarios) $\xi_s := (q_s, h_s, V_s, W_s)$ with respective probabilities $p_s$:

$$\mathbb{E}[Q(x,\xi)] = \Sigma_{s=1}^{S} p_s Q(x, \xi_s) \quad (3)$$

The whole two-stage problem is equivalent to the following problem:

$$\min_{x \in \mathbb{R}^n} c'x + \Sigma_{s=1}^{S} p_s q_s' y_s$$

$$s.t.\ \Sigma_j a_{ij} x_j \leq b_i$$

$$\Sigma_k V_{ks} x_k + \Sigma_k W_{ks} y_s \leq h_s\ s=1,\ldots, S \quad (4)$$

Another embodiment performs mathematical modeling of the EVs for optimal planning, operation, and control purposes is new.

Energy balance equation for MES is given as follows:

$$e_{mes,t,s} = \quad (5)$$

$$(1 - \Phi_{mes}) e_{mes,t-1,s} + \tau \left( p^{chg}_{mes,t,s} \eta^{chg}_{mes} - \frac{p^{dch}_{mes,t,s}}{\eta^{dch}_{mes}} \right) + E^{conn}_{mes,t,s} - E^{disc}_{mes,t,s}$$

where $E_{mes,t,s}^{conn}$ and $E_{mes,t,s}^{disc}$ represent stochastic energy level of EVs connected to and disconnected from at time t in scenario s, respectively. These parameters are assumed to be random inputs to this model.

Energy storage levels of EVs are limited by minimum and maximum available capacities of the EVs at each time interval in each scenario, $\underline{E}_{mes,t,s}$ and $\overline{E}_{mes,t,s}$ respectively, as follows:

$$\underline{SOC}_{mes,s} \overline{E}_{mes,t,s} \leq e_{mes,t,s} \leq \overline{SOC}_{mes,s} \overline{E}_{mes,t,s} \quad (6)$$

where minimum and maximum available capacities of the EVs are calculated using following equations:

$$\overline{E}_{mes,t,s} = (\overline{E}_{mes,t-1,s} + \overline{E}^{conn}_{mes,t,s} - \overline{E}^{disc}_{mes,t,s}) \quad (7)$$

$$\underline{E}_{mes,t,s} = (\underline{E}_{mes,t-1,s} + \underline{E}^{conn}_{mes,t,s} - \underline{E}^{disc}_{mes,t,s}) \quad (8)$$

One embodiment considers charge/discharge constraints of EVs. The following constraints are considered to ensure that $p_{mes,t}^{chg}$ and $p_{mes,t}^{dch}$ are less than maximum charging and discharging power of the EVs at each time interval:

$$0 \leq p_{mes,t,s}^{chg} \leq u_{mes,t,s}^{chg} \overline{P}_{mes,t,s} \quad (9)$$

$$0 \leq p_{mes,t,s}^{dch} \leq u_{mes,t,s}^{dch} \overline{P}_{mes,t,s} \quad (10)$$

where $\overline{P}_{mes,t,s}$ and $\overline{P}_{mes,t,s}$ are calculated as follows:

$$\overline{P}_{mes,t,s} = (\overline{P}_{mes,t-1,s} + \overline{P}^{conn}_{mes,t,s} - \overline{P}^{disc}_{mes,t,s}) \quad (11)$$

Operational and maintenance costs of EVs includes its degradation costs and considers the effect of charging and discharging cycles on capacity loss of the EVS, is assumed to be proportional to the number of charging and discharging cycles, and is modeled as follows:

$$v_{ses,t,s}^{chg} \geq u_{ses,t,s}^{chg} - u_{ses,t,s-1}^{chg} \quad (12)$$

$$v_{ses,t,s}^{dch} \geq u_{ses,t,s}^{dch} - u_{ses,t-1,s}^{dch} \quad (13)$$

$$C_{mes,t,s} = C_{mes}^{dg} \frac{1}{2} \left( v_{mes,t,s}^{chg} + v_{mes,t,s}^{dch} \right) + \quad (14)$$

$$C_{mes}^c \overline{E}_{mes,t,s} + \frac{p_{mes,t,s}^{dch}}{\eta_{mes}^{dch}} C_{mes,t,s}^s - \frac{p_{mes,t,s}^{chg}}{\eta_{mes}^{chg}} C_{mes,t,s}^d$$

where $C_{mes,s}^{dg}$ represents costs of the EVs degradation per cycle to be paid to EV owners to reimburse their battery degradation due to charge and discharge, and $C_{mes,s}^c$ denotes capacity costs to be paid to EV owners for the hours connecting their vehicles in each scenario. $C_{mes,t,s}^s$ and $C_{mes,t,s}^d$ represent the selling and buying energy price of the EV in each scenario, respectively.

The arrival and departure times of EVs (driving patterns) are treated as a probabilistic quantities. For each time interval a distribution of different trips (driving patterns) is constructed. Using these trip distribution functions, distribution functions are built for the arrival and departure times of EVs. For each time interval, a probability distribution of connectivity is calculated based on the distribution of driving.

In one embodiment, available charging/discharge power capacity of EVs is formulated as a random variable. Probability distributions of the initial energy level of EVs' batteries are built based on historical data for each time interval. Using this probability distributions and data generated, total connected EVs' charging/discharge power capacity is constructed, which at each time interval has a mean value and variance Available charging/discharging energy capacity of EVs is formulated as a random variable. Probability distributions of the initial energy level of EVs' batteries are built based on historical data for each time interval. Using this probability distributions and data generated in prior operation, total connected EVs' charging/discharge energy capacity is constructed, which at each time interval has a mean value and variance.

Modeling degradation costs of EV batteries can be done. In one embodiment, $C_{mes,s}^{dg}$ represents costs of the EVs degradation per cycle to be paid to EV owners to reimburse their battery degradation due to charge and discharge, and $C_{mes,s}^c$ denotes capacity costs to be paid to EV owners for the hours connecting their vehicles in each scenario.

The system can perform mathematical modeling of the grid connection in the problem formulation. The system can consider peak demand charges for grid connection.

The system can also modeling contribution of EVs is Spinning Reserve requirements. In one embodiment, Spinning Reserve contributions of EVs are calculated as follows:

$$p_{mes,t,s}^{sp} = \min \left\{ \frac{(e_{mes,t,s} - \underline{SOC}_{mes,s} \overline{E}_{mes,t,s})}{\tau}, \overline{P}_{mes,t,s} - p_{mes,t,s}^{dch} \right\} \quad (16)$$

These constraints are reformulated as linear constraints in the mode as follows:

$$p_{mes,t,s}^{sp} \leq \frac{(e_{mes,t,s} - \underline{SOC}_{mes,s} \overline{E}_{mes,t,s})}{\tau} \quad (17)$$

$$p_{mes,t,s}^{sp} \leq \overline{P}_{mes,t,s} - p_{mes,t,s}^{dch} \quad (18)$$

The system can consider uncertainty in energy prices for grid connection. The model can be formulated as a whole two-stage problem. Stochastic optimization techniques can be used to model electric vehicles as mobile energy storage is new. Another embodiment applies stochastic scenario based MILP modeling.

A Single Objective stochastic scenario based MILP modeling of the problem can be done, and the following objective functions are considered for the single objective MILP model of C1:
1—Maximization of daily profit
2—Minimization of GHG emissions
3—Minimization of total costs In another embodiment, a Multi-Objective stochastic scenario based MILP modeling of the problem can be done. Any combination of the following objectives can be used for the multi-objective MILP model:
1—Maximization of daily profit
2—Minimization of GHG emissions
3—Minimization of total costs Stochastic scenario based MINLP modeling of the problem can be done, with a non-linear energy balance equation for EVs is given as follows:

$$e_{mes,t,s} = (1-\Phi_{mes})e_{mes,t-1,s} + \tau\left(p_{mes,t,s}^{chg}\eta_{mes,t,s}^{chg} - \frac{p_{mes,t,s}^{dch}}{\eta_{mes,t,s}^{dch}}\right) + E_{mes,t,s}^{conn} - E_{mes,t,s}^{disc} \quad (19)$$

where $\eta_{mes,t,s}^{chg}$ and $\eta_{mes,t,s}^{dch}$ are functions of $p_{mes,t,s}^{chg}$ and $p_{mes,t,s}^{dch}$ at each time and scenario, respectively. This makes Problem C1 an MINLP problem, which is a new formulation for this problem.

A Single Objective stochastic scenario based MINLP modeling of the problem can be used. The following objective functions are considered for the single objective MINLP model of C1:
1—Maximization of daily profit
2—Minimization of GHG emissions
3—Minimization of total costs Another embodiment performs Multi-Objective stochastic scenario based MINLP modeling of the problem. Any combination of the following objectives can be used for the multi-objective MINLP model of C1:
1—Maximization of daily profit
2—Minimization of GHG emissions
3—Minimization of total costs The modeling of the uncertain parameters in scenario based stochastic programming approach to model electric vehicles as mobile energy storage can be done. The system can calculate discretized probability distribution functions of the uncertain parameters for problem. For each time interval the following approach is used to construct discretized probability distribution functions of the uncertain parameters. The continuous probability distribution curves are constructed from data, then are discretized to quantize different levels. The process of discretization is required for the proposed optimization method. The discrete levels considered are [μ−3σ, μ−2σ, μ−σ, μ, μ+σ, μ+2σ, μ+3σ] with corresponding probabilities obtained from a given probability distribution function. Here μ is the mean value at an interval and σ represents the standard deviation of the data at each time interval.

Selection of the first and second stage variables in the scenario based stochastic programming approach to model electric vehicles as mobile energy storage can also be done. Variables used for the optimal operation and control of various devices such as EVs, DERs, grid connections, and stationary energy storages at each time interval are selected as second-stage variables. Variables such as total number of EVs, power and energy capacity of total EVs, power and energy capacity of DERs, Grid connection, and stationary storage systems are considered as the first-stage variables.

The above system determines economic and environmental benefits of the application of EVs as MES in commercial building μGs. Energy systems of a commercial building including its grid connection, DERs, Stationary Energy Storage (SES), and demand profile are modeled. Based on the developed models, a Mixed Integer Linear Programming (MILP) problem is formulated to optimizes the operation of a commercial building μG. The objective is to minimize μG's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial μG.

What is claimed is:

1. A method for energy management, comprising:
receiving, by electronics in a microgrid, parameters from energy management system components;
generating a stochastic model for electric vehicle (EV) operation as mobile energy storage (MES) for optimal planning, operation, and control purposes; solving an optimization problem for optimal planning, operation, and control purposes; controlling operation of EVs according to the optimization model to lower operating cost and emissions;
controlling operation of EVs according to the optimization model to ensure a predetermined level of reliability; and
modeling the EVs for optimal planning, operation, and control using an MES energy balance equation:

$$e_{mes,t,s} = (1-\Phi_{mes})e_{mes,t-1,s} + \tau\left(p_{mes,t,s}^{chg}\eta_{mes}^{chg} - \frac{p_{mes,t,s}^{dch}}{\eta_{mes}^{dch}}\right) + E_{mes,t,s}^{conn} - E_{mes,t,s}^{disc}$$

where $E_{mes,ts}^{conn}$ and $E_{mes,ts}^{disc}$ represent stochastic energy level of EVs connected to and disconnected from at time t in scenario s, respectively and wherein energy storage levels of EVs are limited by minimum and maximum available capacities of the EVs at each time interval in each scenario, $\underline{E}_{mes,ts}$ and $\overline{E}_{mes,ts}$ respectively, as follows:

$$\underline{SOC}_{mes,s}\overline{E}_{mes,ts} \leq e_{mes,ts} \leq \overline{SOC}_{mes,s}\overline{E}_{mes,ts}$$

where minimum and maximum available capacities of the EVs are calculated using following equations:

$$\overline{E}_{mes,ts} = (\overline{E}_{mes,t-1,s} + \overline{E}_{mes,ts}^{conn} - \overline{E}_{mes,ts}^{disc})$$

$$\underline{E}_{mes,ts} = (\underline{E}_{mes,t-1,s} + \underline{E}_{mes,ts}^{conn} - \underline{E}_{mes,ts}^{conn}).$$

2. The method of claim 1, wherein the stochastic programming model comprises a two-stage stochastic formulation and selection of first and second-stage variables.

3. The method of claim 1, comprising generating a probabilistic model of EVs, including arrival and departure times, and charging and discharging energy and power capacities.

4. The method of claim 1, comprising performing probabilistic modeling of contribution of EVs in spinning reserve requirements.

5. The method of claim 1, comprising constructing discretized probability distribution functions for random quantities.

6. The method of claim 1, comprising determining $$\min_{x \in \mathbb{R}^n} c'x + \mathbb{E}[Q(x,\xi)]$$

s.t. $\Sigma_j a_{ij} x_j \leq b_i$ where $Q(x, \xi)$ is the optimal value of a second-stage problem:

$$\min_{y \in \mathbb{R}^m} q'y$$

s.t. $\Sigma_k V_{ks} x_k + \Sigma_k w_{ks} y_s \leq h_s$ where $\xi := (q, h, V, W)$ are the data of a second-stage problem, and elements of vector $\xi$ are random, $\mathbb{E}[Q(x,\xi)]$ is the expected operator with respect to probability distribution of $\xi$, where $\xi_s := (q_s, h_s, V_s, W_s)$ with respective probabilities $p_s$:

$\mathbb{E}[Q(x,\xi)] = \Sigma_{s=1}^{S} p_s Q(x,\xi_s)$.

7. The method of claim 1, comprising applying charge/discharge constraints of EVs to ensure that $p_{mes,t}^{chg}$ and $p_{mes,t}^{dch}$ are less than maximum charging and discharging power of the EVs at each time interval:

$$0 \leq p_{mes,t,s}^{chg} \leq u_{mes,t,s}^{chg} \overline{P}_{mes,t,s}$$

$$0 \leq p_{mes,t,s}^{dch} \leq u_{mes,t,s}^{dch} \overline{P}_{mes,t,s}$$

where $\overline{P}_{mes,t,s}$ and $\overline{P}_{mes,t,s}$ are calculated as follows:

$$\overline{P}_{mes,t,s} = (\overline{P}_{mes,t-1,s} + \overline{P}_{mes,t,s}^{conn} - \overline{P}_{mes,t,s}^{disc})$$

and wherein operational and maintenance costs of EVs includes degradation costs and an effect of charging and discharging cycles on capacity loss of the EVS, as follows:

$$v_{ses,t,s}^{chg} \geq u_{ses,t,s}^{chg} - u_{ses,t,s-1}^{chg}$$

$$v_{ses,t,s}^{dch} \geq u_{ses,t,s}^{dch} - u_{ses,t-1,s}^{dch}$$

$$C_{mes,t,s} = C_{mes}^{dg} \frac{1}{2}\left(v_{mes,t,s}^{chg} + v_{mes,t,s}^{dch}\right) + C_{mes}^{c} \overline{E}_{mes,t,s} + \frac{p_{mes,t,s}^{dch}}{\eta_{lmes}^{dch}} C_{mes,t,s}^{s} - \frac{p_{mes,t,s}^{chg}}{\eta_{lmes}^{chg}} C_{mes,t,s}^{d}.$$

where $C_{mes,s}^{dg}$ represents costs of the EVs degradation per cycle to be paid to EV owners to reimburse battery degradation due to charge and discharge, and $C_{mes,s}^{c}$ denotes capacity costs to be paid to EV owners for hours connecting their vehicles in each scenario, and $C_{mes,t,s}^{s}$ and $C_{mes,t,s}^{d}$ represent the selling and buying energy price of the EV.

8. The method of claim 1, comprising modeling available charging/discharging energy capacity of EVs is formulated as a random variable.

9. The method of claim 1, comprising modeling degradation costs of EV batteries.

10. The method of claim 1, comprising modeling of the grid connection and peak demand charges for grid connection.

11. The method of claim 1, comprising modeling contribution of EVs is Spinning Reserve requirements as follows:

$$p_{mes,t,s}^{sp} = \min\left\{\frac{(e_{mes,t,s} - \underline{SOC}_{mes,s}\overline{E}_{mes,t,s})}{\tau}, \overline{P}_{mes,t,s} - p_{mes,t,s}^{dch}\right\}$$

with constraints reformulated as linear constraints in the mode as follows:

$$p_{mes,t,s}^{sp} \leq \frac{(e_{mes,t,s} - \underline{SOC}_{mes,s}\overline{E}_{mes,t,s})}{\tau} \text{ and } P_{mes,t,s}^{sp} \leq \overline{P}_{mes,t,s} - p_{mes,t,s}^{dch}.$$

12. The method of claim 1, comprising modeling uncertainty in energy prices for grid connection.

13. The method of claim 1, comprising modeling stochastic optimization techniques to model electric vehicles as mobile energy storage.

14. The method of claim 1, comprising modeling scenario based stochastic programming approach to model electric vehicles as mobile energy storage.

15. The method of claim 1, comprising modeling stochastic scenario based MILP modeling.

16. The method of claim 1, comprising modeling single objective MILP model with maximization of daily profit, minimization of GHG emissions, and minimization of total costs.

17. The method of claim 1, comprising modeling single objective or multiple objective stochastic scenario based MILP modeling.

18. The method of claim 1, comprising modeling nonlinear energy balance equation for EVs as:

$$e_{mes,t,s} = (1 - \Phi_{mes})e_{mes,t-1,s} + \tau\left(p_{mes,t,s}^{chg}\eta_{lmes,t,s}^{chg} - \frac{p_{mes,t,s}^{dch}}{\eta_{lmes,t,s}^{dch}}\right) + E_{mes,t,s}^{conn} - E_{mes,t,s}^{disc}$$

where and $\eta_{mes,t,s}^{chg}$ and $\eta_{mes,t,s}^{dch}$ are functions of $p_{mes,t,s}^{chg}$ and $p_{mes,t,s}^{dch}$ at each time and scenario, respectively.

19. The method of claim 1, comprising modeling of uncertain parameters in scenario based stochastic programming approach to model electric vehicles as mobile energy storage.

20. The method of claim 1, comprising selecting first and second stage variables in a scenario based stochastic programming approach to model electric vehicles as mobile energy storage.

* * * * *